(12) United States Patent
Savitzky et al.

(10) Patent No.: US 7,430,714 B1
(45) Date of Patent: Sep. 30, 2008

(54) DOCUMENT STORAGE SYSTEM INCLUDING A USER INTERFACE FOR ASSOCIATING DOCUMENTS INTO GROUPS

(75) Inventors: Stephen Savitzky, San Jose, CA (US); Gregory Wolff, Mountain View, CA (US); Mark Peairs, Menlo Park, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/302,552

(22) Filed: Apr. 30, 1999

(51) Int. Cl.
*G06F 17/00* (2006.01)
*H04L 9/00* (2006.01)

(52) U.S. Cl. .................... 715/255; 715/273; 715/741; 713/176

(58) Field of Classification Search ............... 707/530; 705/58, 52; 713/176, 165, 166, 167, 168, 713/182, 153, 161, 183, 1; 715/531.1, 200, 715/209, 255, 273, 274, 741, 743; 717/153, 717/161, 176, 182, 183
See application file for complete search history.

(56) References Cited

U.S. PATENT DOCUMENTS

| | | |
|---|---|---|
| 4,899,299 A | 2/1990 | MacPhail |
| 4,994,985 A | 2/1991 | Cree et al. |
| 5,051,891 A | 9/1991 | MacPhail |
| 5,060,135 A | 10/1991 | Levine et al. |
| 5,063,495 A | 11/1991 | MacPhail |
| 5,089,956 A | 2/1992 | MacPhail |
| 5,101,345 A | 3/1992 | MacPhail |
| 5,107,419 A | 4/1992 | MacPhail |
| 5,142,678 A | 8/1992 | MacPhail |
| 5,168,444 A * | 12/1992 | Cukor et al. ............ 705/1 |
| 5,179,718 A | 1/1993 | MacPhail |
| 5,237,679 A * | 8/1993 | Wang et al. ............ 707/206 |

(Continued)

FOREIGN PATENT DOCUMENTS

JP   01-131960   5/1989

(Continued)

OTHER PUBLICATIONS

IBM Technical Disclosure Bulletin, "On-line Stapler", Volume No. 35, pp. 435-436, Publication-Date Jul. 1992.*

(Continued)

*Primary Examiner*—Doug Hutton
*Assistant Examiner*—Maikhanh Nguyen
(74) *Attorney, Agent, or Firm*—Townsend and Townsend and Crew LLP

(57) ABSTRACT

An electronic document handling system places electronic documents on stacks and "staples" the documents in a stack together. A user selects at least one document and places the selected document(s) onto a stack, The system generates a cover sheet including a table of contents; a title; keywords and/or annotations; and/or controls for: adding or deleting pages or documents from the stack, changing cover sheet contents, and/or controls for "stapling" the stack. An electronic file including the cover sheet data electronically represents a stapled stack. The stack can be secured by encryption with a user or system supplied key or password. The system computes a cryptographic checksum for the stack of documents and affixes the user's or the system's digital signature to the cover sheet. After stapling, the stack or a file representing the stack is stored in a stack database or file structure.

8 Claims, 5 Drawing Sheets

U.S. PATENT DOCUMENTS

| | | | |
|---|---|---|---|
| 5,280,609 A | | 1/1994 | MacPhail |
| 5,428,734 A | | 6/1995 | Haynes et al. |
| 5,659,164 A | * | 8/1997 | Schmid et al. ............... 235/375 |
| 5,706,454 A | | 1/1998 | MacPhail |
| 5,771,103 A | * | 6/1998 | Ogino ........................ 358/437 |
| 5,781,629 A | * | 7/1998 | Haber et al. ................ 713/177 |
| 5,808,409 A | * | 9/1998 | Matsuda et al. ....... 252/301.4 R |
| 6,151,610 A | * | 11/2000 | Senn et al. .................. 715/516 |
| 6,401,206 B1 | * | 6/2002 | Khan et al. ................. 713/176 |
| 6,609,200 B2 | * | 8/2003 | Anderson et al. ........... 713/176 |
| 6,820,094 B1 | * | 11/2004 | Ferguson et al. ............ 707/200 |

FOREIGN PATENT DOCUMENTS

| | | |
|---|---|---|
| JP | 01-189771 | 7/1989 |
| JP | 06-215040 | 8/1994 |
| JP | 07-121570 | 5/1995 |
| JP | 10-254783 | 9/1998 |
| JP | 10-326078 | 12/1998 |

OTHER PUBLICATIONS

"Direct Manipulation Stapler Icon:" *Research Disclosure 34146*; Sep. 10, 1992; pp. 712.

* cited by examiner

DOCUMENT STORAGE SYSTEM INCLUDING A USER INTERFACE FOR ASSOCIATING DOCUMENTS INTO GROUPS

BACKGROUND OF THE INVENTION

The present invention relates to the field of document storage and retrieval. More specifically, one embodiment of the invention provides a document handler that includes document associations.

Documents that may have been efficiently handled in the past as paper documents are being replaced by electronic documents. There are several reasons for this. The costs of scanning and storing documents electronically are falling so much, relative to the cost of storing paper documents, that it will soon be uneconomical to store paper documents in bulk. In addition to storage costs, some document operations are considerably easier when the documents are in electronic form. For example, temporary or single use copies of specific documents can be made electronically, thus eliminating paper waste. If an electronic document is stored in a text searchable format, it can be easily searched. Even if it is not stored in text searchable format, it can be passed through an optical character recognition (OCR) process to generate searchable text, or it can be searched using more advanced techniques, such as those described in U.S. Pat. Nos. 5,465,353 and 5,717,940, each of which is incorporated by reference herein for all purposes.

Despite the advantages of the electronic form, the paper form of a document still has retained some advantages over conventional electronic documents. Often, it is hard for a person to mentally picture an electronic document, whereas a person can touch a paper document, crinkle it, or add it to a stack of papers on his or her desk. Paper documents have been preferred by some for purely aesthetic reasons, but have also been preferred where there is no electronic analogue to a paper document operation.

Some paper document operations have close analogues in electronic document processing, such as being copied, being stored in files (and files being stored within other files or within file cabinets), being viewed, or being moved around a (virtual) desktop. Other paper document operations have not heretofore had analogues in electronic document processing, such as being stapled. Stapling provides an association between the papers that are being stapled. The typical staple is removable, thereby making the association only semipermanent. However, other forms of "stapling" such as binding and ribbonning make for a more permanent stapling or association of a plurality of papers. Once stapled, a stack of papers can be manipulated as a unit as it is stored, transported or the like. Also, if a stack of papers is stapled, it is an indication that a paper document is complete and removed staples are generally observable on paper documents.

SUMMARY OF THE INVENTION

In one embodiment of an electronic document handling system according to the present invention, electronic documents placed on virtual "stacks" and a virtual "stapling" capability is provided to associate the electronic documents in a virtual stack with each other. In a particular embodiment, a user (a human or a computer process) selects one document or a plurality of documents and places the selected document(s), or references thereto, onto a stack, and a stack cover sheet is generated. The stack cover sheet might contain a table of contents, a title, one or more keywords and/or annotations, as well as controls applicable to the stack. The controls might include controls for adding or deleting pages or documents from the stack, controls for changing cover sheet contents and controls for "stapling" the stack.

A stapled stack might be electronically represented by an electronic file containing the cover sheet data, and possibly copies of the stapled documents themselves. Documents that are in permanent form might be left in place, with the cover sheet including just references to the documents instead of the documents themselves.

In a particular system for securing electronically stapled documents according to the present invention, the stack is secured by a key (or password) supplied by the user or a private key of a permanent storage device which operates the electronic stapler. Optionally, the documents in the stack are encrypted using the same key or a related key. A cryptographic checksum is computed for the stack of documents and the user's, or the system's, digital signature is affixed to the stack's cover sheet. Once a stack is stapled, the stack or a file representing the stack might be stored in a stack database or file structure. The stack cover sheet then can be used as an indication that a given set of documents existed together at one time, and possibly one place.

A further understanding of the nature and advantages of the inventions herein may be realized by reference to the remaining portions of the specification and the attached drawings.

DESCRIPTION OF THE SPECIFIC EMBODIMENTS

An "electronic document" as used herein refers to a collection of text, graphics or other data representable by page images presented on one or more pages, which may include other nonimage data, such as audio data, video data, program code or other machine readable data which can be collected into a unit.

Figure 1:
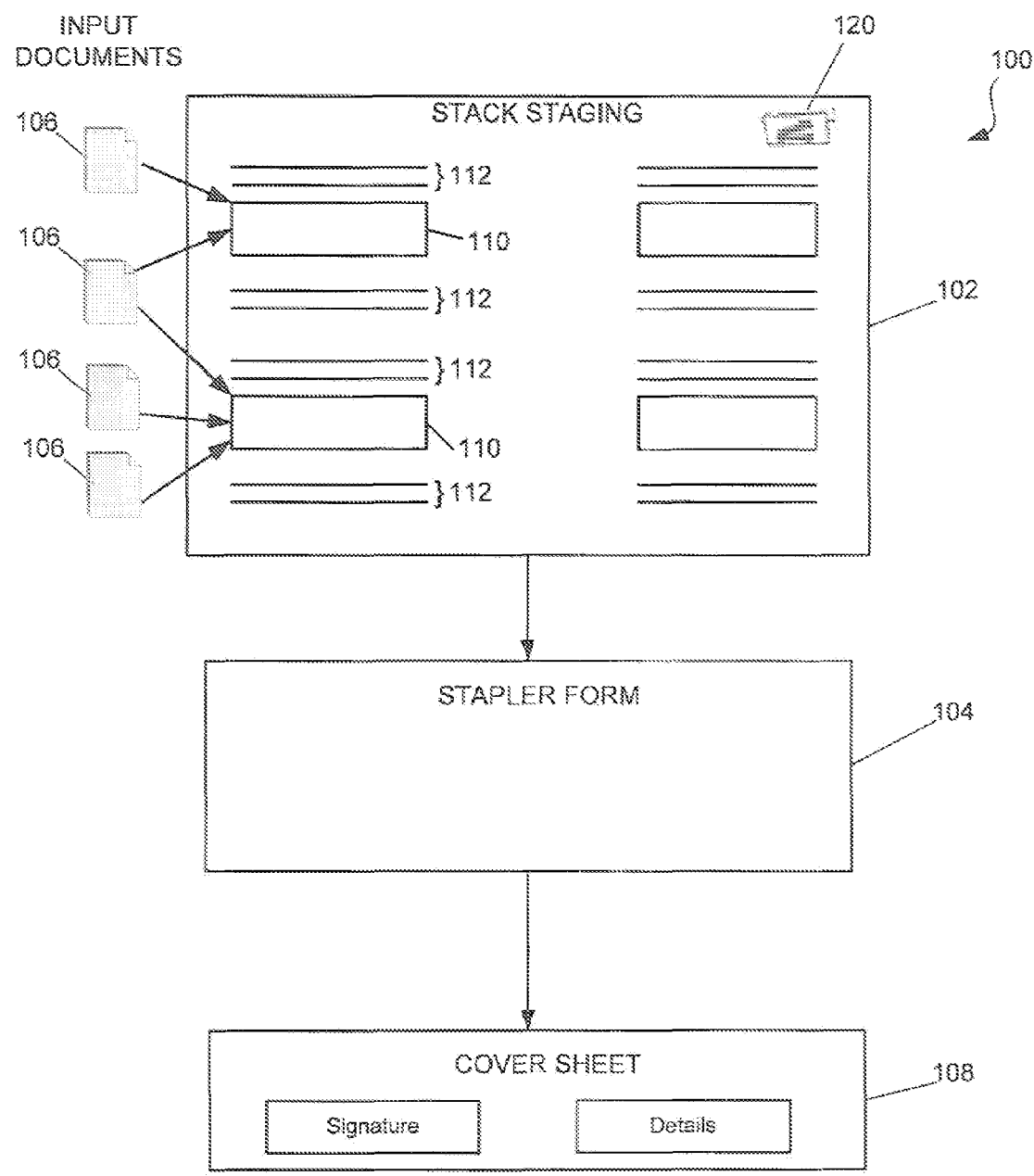
FIG. 1 is a block diagram of a stapler system according to one embodiment of the present invention.

FIG. 1 shows a stapler system 100 comprising a stack staging area 102 and a stapler form 104. It should be understood that stapler system 100 could be implemented in any manner of digital computer environment, and to the extent that the environment is well known in the art, it is not described here. One such environment that might be used is that described in U.S. application Ser. No. 09/303,818, filed Apr. 30, 1999 and entitled "Method and System for Processing Documents Controlled by Active Documents with Embedded Instructions"; that application is commonly owned with the present application and is incorporated by reference herein for all purposes. In that system, operations such as stapling are handled by active documents, such as stapler form 104 shown in FIG. 1.

In operation, stapler system 100 operates on input documents 106 to generate stapler cover sheets 108. A user selects documents to be stapled, usually in a conventional manner, such as graphically selecting document icons presented to the user, selecting files by name or from a directory listing, or using some other method. It should be understood that the documents need not be local to stapler system 100, but could be documents on a remote server or documents found in the global internetwork of networks known as the "Internet". It should also be understood that the user need not be a human user, but might be a computer program which is selecting documents and requesting that the selected documents be stapled. Of course, the user interface for selecting documents and initiating a stapling operation may differ depending on the type of user.

Once a document or a set of documents is selected, the user adds them to a virtual stack 110 within stack staging area 102. A virtual stack 110 can either be a new, empty stack or an "open" stack, i.e., one that has documents but that has not yet been stapled. Depending on the user interface capabilities, icons representing documents might be dragged onto stack icons or documents might be selected using toolbars, buttons, menu items or the like. If a browser is used to select documents, as might be the case with selecting Internet-located documents, an icon, button or link might be added to a selectable document by the browser's user interface or by a proxy server through which the documents pass.

At any time before the stapling operation, a user is allowed to modify the stack "cover sheet data" 112. In a particular embodiment, the cover sheet data includes a table of contents, controls for deleting a documents, adding a document by filename or URL, a control (icon or button) for initiating the stapling operation and text fields for title, keywords, annotations and the like. One method of initiating a stapling operation is for the user to click on a stapler icon 120 located within stack staging area 102.

If the documents are not permanent and unalterable (at least as far as the user can control), then the documents, as they are selected, are copied to a storage device under control of the user, such as a directory in the user's local file storage or on a server running a stapler proxy server. If documents are in a permanent and unalterable form, such as documents controlled by a version control system, they can be left in place and represented by a link to the unalterable form. If a stapler system is running on a server that contains permanent storage for documents, the stapler system can easily identify which documents in that storage need not be copied.

Figure 2:
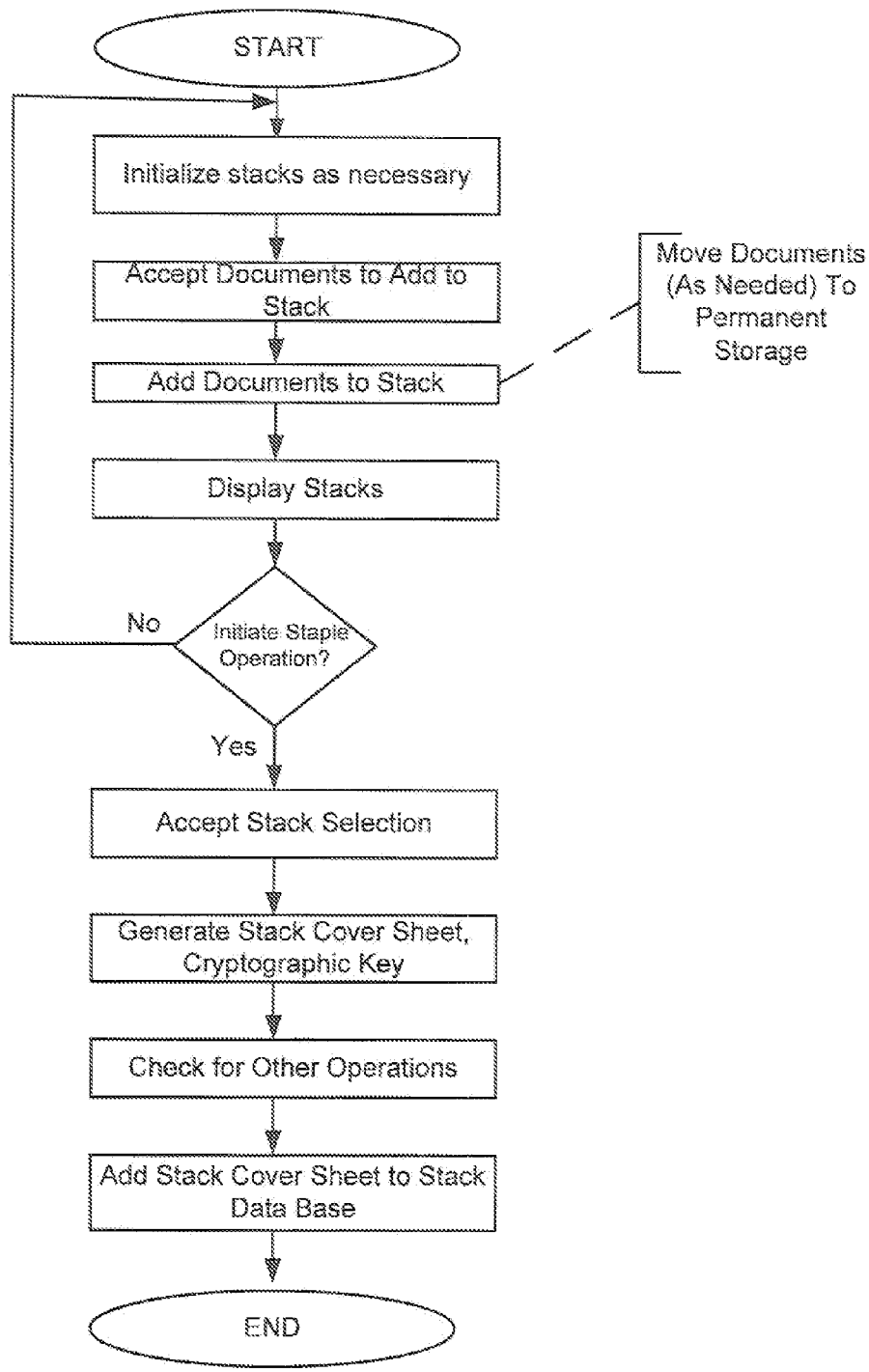
FIG. 2 is a flowchart of a process for electronically stapling documents according to one embodiment of the present invention.

The process of stapling is shown in FIG. 2 as a flowchart. As shown there, the process begins with the initialization of stacks. A stack begins as an empty stack. As documents are added to an empty stack, it becomes an open stack. The user can specify documents to be added to the open stack and documents to be removed from the open stack. Preferably, a display for each open stack is updated as documents are added and removed. If the documents are not in a permanent storage, they can be moved to permanent storage as they are selected. Alternatively, they can be moved once the stapling operation is initiated. Strictly speaking, no form of storage is permanent for all time and all conditions. Therefore, as used here, the term "permanent storage" should be understood to be storage that allows the user to rely on the continued existence of a document for a time period of relevance to the user and controls which prevent others from modifying or deleting the document with some prespecified level of security. In some cases, where the user will need to prove in the future that certain documents existed and were stapled at some point in the past, the controls might also prevent the user from modifying of deleting documents.

However documents are controlled, once the stapling operation is initiated, the documents are "stapled" and controlled under the constraints of the stapling system. In the embodiment shown in the figures, the stapling operation generates a stack cover sheet. As shown in FIG. 1, stack cover sheet 108 is the output of processing stapler form 104, which is an active document. Stack cover sheet 108 includes a table of contents listing the documents being stapled (optionally including pointers to the beginnings of each document), a stack title, stack keywords, stack annotations and a stack signature. In a particular embodiment, the stack signature is a checksum of the contents of all of the documents in the stack, signed by the digital signature of the user or the digital signature or private key of the stapler system. In some cases, a key is used to encrypt the documents in the stack.

In the preferred embodiment, the stack cover sheet is added to a stack database, where others can reference it. Depending on the security needs and the uses of stacks, security controls might be placed on the stack database. For example, if the stacks are to be used to prove to others that a stack was stapled and the documents existed at some point in the past, the stack database could be secured so that users could not modify or delete records in the stack database. Of course, those that would rely on such proof must have trust in the operator of the stack database.

Once the stapling operation is complete, the open stack becomes a "stapled" stack. Other operations incident to stack stapling, such as printing a stack cover sheet, or the like can be performed at this point. It should be noted that, while FIG. 2 shows the stapling of one stack, many stacks could be open at a time, as shown in FIG. 1.

Figure 3:
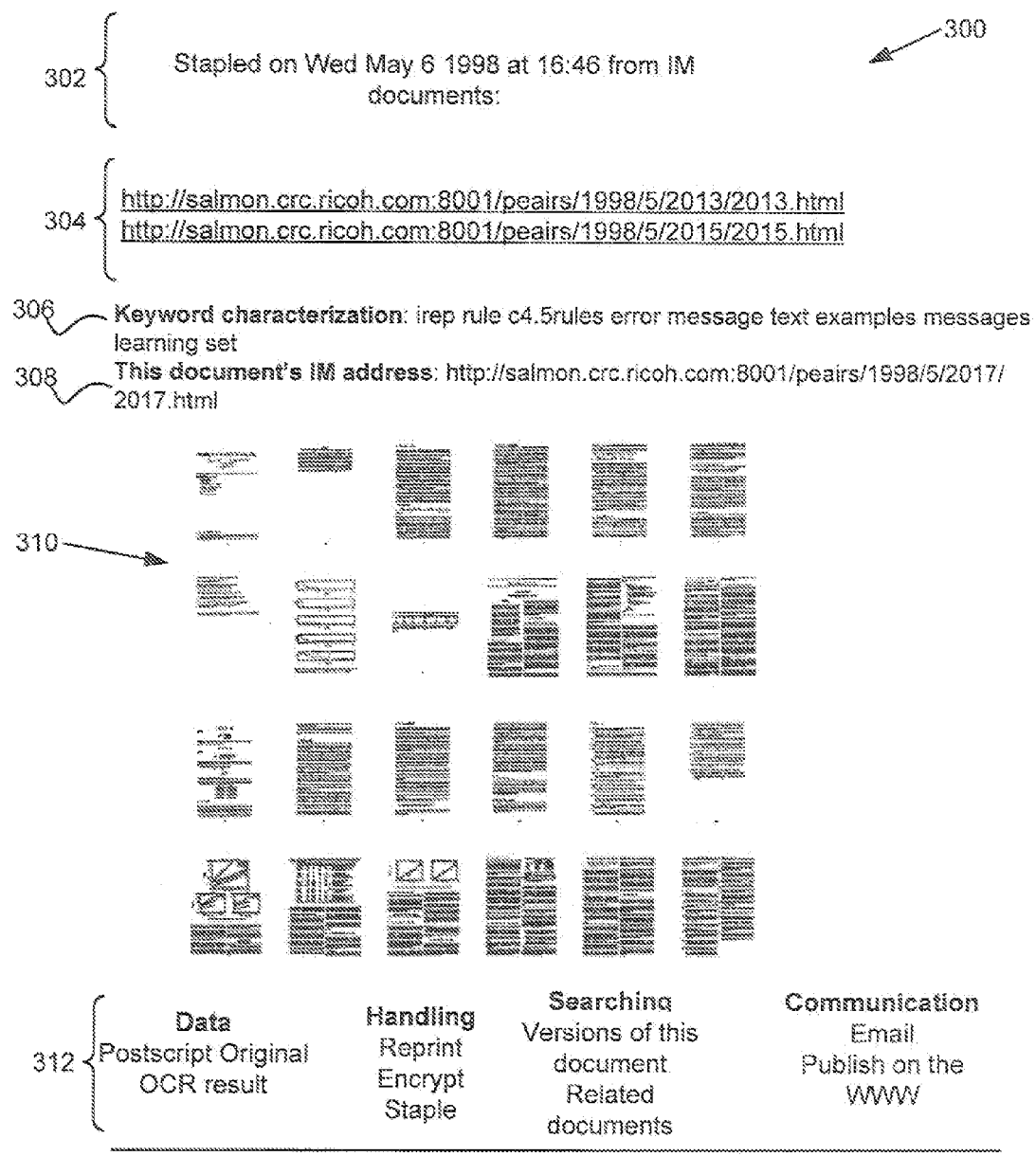
FIG. 3 is a representation of a stapled stack produced by the stapler system shown in FIG. 1.

FIG. 3 is an illustration of a one embodiment of a stack cover sheet 300, which includes a title 302, a table of contents 304, a searchable stack keywords listing 306, a stack address 308, thumbnail icons representing pages of the stapled documents and controls 310 to be used for initiating stack operations. As shown, stack cover sheet 300 is for an open stack. If it were for a stapled stack, the "Staple" option under the "Handling" menu would not be provided. As should be understood from stack address 308, the stack database where stacks are stored might be just a secured file system.

Figure 4:
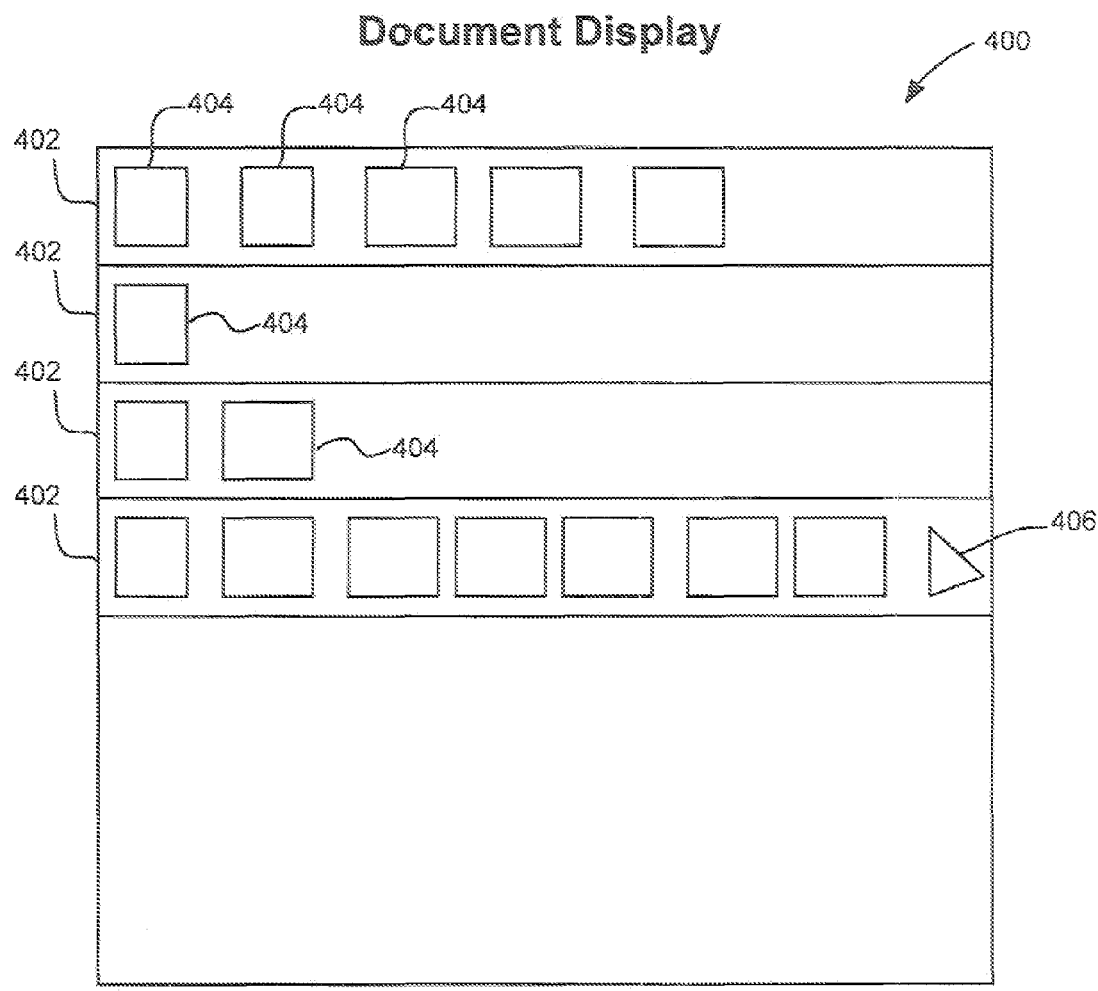
FIG. 4 is a view of a display provided by the stapler system of FIG. 1.

FIG. 4 is a view of a document display 400 provided by the stapler system of FIG. 1. Document display 400 displays the contents of a plurality of stacks 402. For each stack 402, a thumbnail icon 404 is displayed for each page of the documents in the stack. Where the stack contains more pages than can be displayed, as is the case with the fourth stack 402 in document display 400, a scroll button 406 is provided to view additional thumbnail icons.

Figure 5:
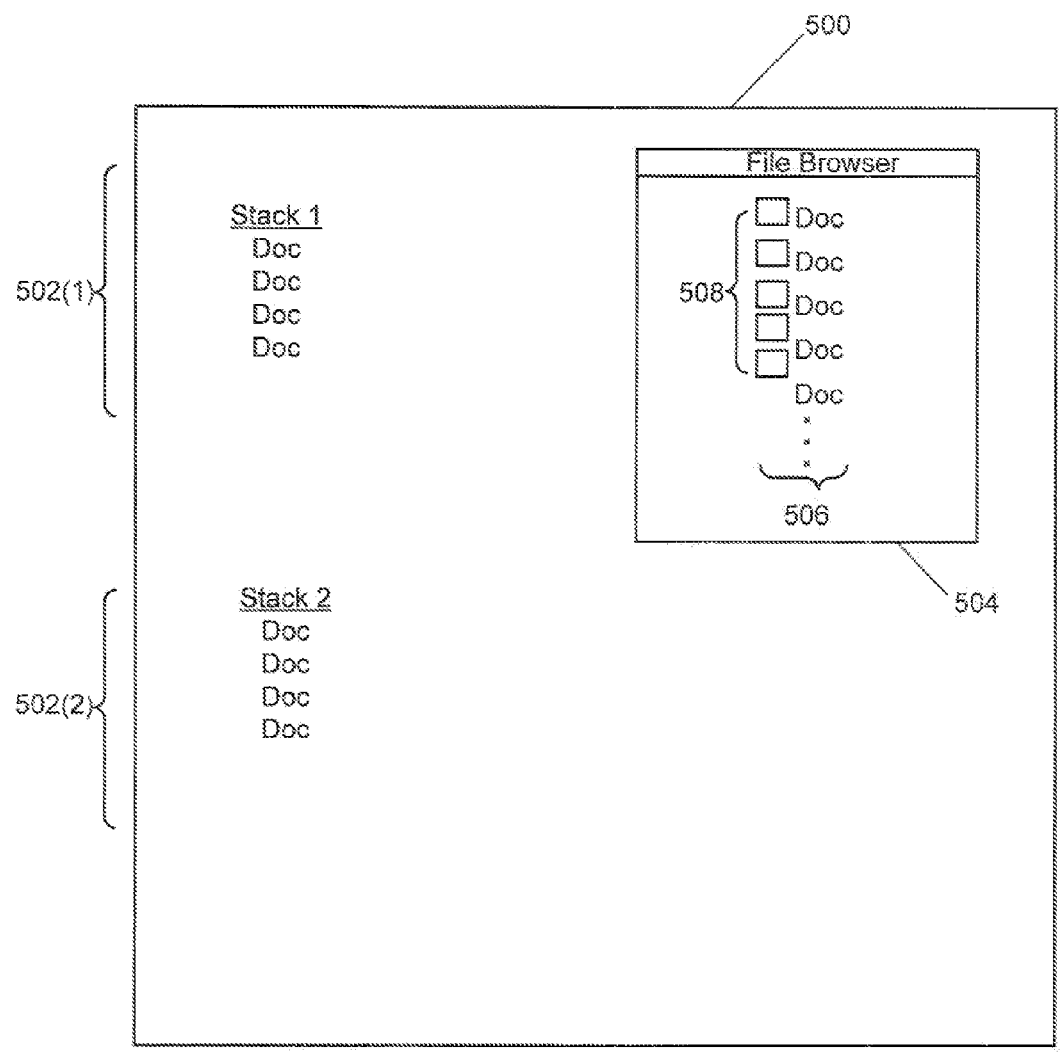
FIG. 5 is a view of a display provided by the stapler system of FIG. 1 for selecting documents.

FIG. 5 is a view of a document selection display 500 provided by the stapler system of FIG. 1. Document selection display 500 is used primarily for selection of documents and pages for inclusion on open stacks. As shown, display 500 presents two open stacks 502 (called out as 502(1) and 502(2) in the figure). A file browser 504 is also shown, listing document labels 506 in one column and check boxes 508 for document selection in an adjacent column. To include a document from file browser 504 into the current open stack (either stack 502(1) or stack 502(2)), the user would click on the check box 508 next to the desired document. In some variations of document selection display 500, documents from file browser 504 could be selected for inclusion in an open stack 502 by dragging one or more document label 506 from file browser 504 onto the desired open stack 502.

In summary, a user interface technique has been described by which a human or computer user can make permanent or semipermanent associations between arbitrary electronic documents, such as text, Web pages and images of paper-originated documents. As described, documents are collected into virtual stacks and then a stapling operation is applied to the documents. With permanent stapling, the stapling operation is cryptographically enforced so that no document can be altered or removed from the collection (i.e., the "stapled stack").

The above description is illustrative and not restrictive. Many variations of the invention will become apparent to those of skill in the art upon review of this disclosure. Merely by way of example, a stapler operation for stapling documents has been described, but a stack might include less than all of the pages of a document or a stack could include stapled stacks, in a recursive stapled stack. Furthermore, some staple systems might allow for removable staples. The scope of the invention should, therefore, be determined not with reference to the above description, but instead should be determined with reference to the appended claims along with their full scope of equivalents.

What is claimed is:

1. In an electronic document handling system, a method of manipulating documents comprising the steps of:
    displaying a first list of documents, wherein the first list of documents lists the documents that are selected for inclusion in an open stack;
    displaying a second list of documents, wherein the second list of documents list documents that have not been selected for inclusion in the open stack;
    displaying a user interface control operative to obtain selections from a user of documents from the second list for inclusion in the open stack;
    generating a staple data object representing an association of selected pages of at least two selected documents;
    generating an electronic cover sheet for the staple data object, wherein the electronic cover sheet includes a visual indication that the existence of the association of selected pages and selected documents together at one time has been cryptographically secured by the staple data object;
    accepting from the user a list of at least one page of at least two electronic documents;
    referencing each page or each electronic document in the list as an item of the staple data object;
    prompting for the staple instruction by presenting the user with a stapler icon which, when selected, represents a staple instruction;
    accepting the staple instruction from the user when the user selects the stapler icon, wherein for each of the at least two selected documents, if a document is not stored in a permanent storage, the document is copied to the permanent storage to create the permanent copy of the document and the staple data object is updated to refer to the permanent copy of the document; and
    cryptographically securing the combination of the pages of the at least two electronic documents of the staple data object in response to receipt of the staple instruction, thereby creating an unalterable indicator of the existence and integrity of the association of selected pages and selected documents together at one time.

2. The method of claim 1, wherein the step of accepting a list is a step of accepting a manually input list.

3. The method of claim 1, wherein the step of accepting a list is a step of accepting a computer-generated list.

4. The method of claim 1, further comprising a step of presenting the user with an online form as an aid to selecting pages or documents for association as the stack.

5. The method of claim 1, further comprising a step of copying the selected pages and selected documents in the stack to static storage.

6. The method of claim 1, further comprising a step of copying the selected pages and selected documents in the stack to a local storage device local to the electronic document handling system.

7. In an electronic document handling system, a method of associating documents comprising the steps of:
    generating a stack object representing an association of selected pages and selected documents;
    generating an electronic cover sheet for the stack object, wherein generating an electronic cover sheet for the stack object further comprises:
    storing the electronic cover sheet in a stack database, where it can be referenced;
    accepting from a user a list of at least one page of at least one electronic document;
    referencing each page or each electronic document in the list as an item of the stack object;
    accepting a staple instruction from the user, wherein for each of the selected pages and selected documents, if a selected page or a selected document is not stored in a permanent storage, the selected page or selected document is copied to the permanent storage to create a permanent copy of the selected page or selected document and the staple data object is updated to refer to the permanent copy of the selected page or selected document;
    cryptographically securing the stack object in response to receipt of the staple instruction, thereby creating an unalterable indicator of the existence and integrity of the association of selected pages and selected documents together at one time, wherein cryptographically securing the stack object in response to receipt of the staple instruction further comprises:
    using a stack signature to secure the stack object, wherein the stack signature is a checksum of the contents of all of the selected pages and selected documents in the stack, signed by a digital signature of the user or a digital signature or private key of the system;
    opening the secured stack object upon receipt of a stack open instruction;
    presenting the contents of the secured stack object for perusal by the user;
    accepting additions and deletions of items on the secured stack object; and
    resecuring the secure stack upon receipt of a stack restaple operation.

8. The method of claim 1 wherein the step of generating an electronic cover sheet for the stack object further comprises:
    generating controls for adding and deleting selected pages and selected documents from the stack.

* * * * *